United States Patent [19]
Zimmerer

[11] 3,921,908
[45] Nov. 25, 1975

[54] CORNER IRRIGATION MACHINE
[75] Inventor: Arthur L. Zimmerer, Lindsay, Nebr.
[73] Assignee: Lindsay Manufacturing Company, Lindsay, Nebr.
[22] Filed: Aug. 16, 1974
[21] Appl. No.: 497,866

[52] U.S. Cl.................................. 239/177; 137/344
[51] Int. Cl.².......................................... B05B 3/12
[58] Field of Search....... 239/177, 212, 11; 137/344

[56] References Cited
UNITED STATES PATENTS

| | | | |
|---|---|---|---|
| 2,769,547 | 11/1956 | Hirsch............................. | 239/177 X |
| 3,352,493 | 11/1967 | Curtis................................ | 239/177 |
| 3,628,729 | 12/1971 | Thomas.............................. | 239/177 |

Primary Examiner—M. Henson Wood, Jr.
Assistant Examiner—Michael Mar
Attorney, Agent, or Firm—Kinzer, Plyer, Dorn & McEachran

[57] ABSTRACT

This is concerned with so-called center pivot irrigation systems for irrigating farm and agricultural lands and is more specifically a mechanism for irrigating the corners, or substantial portions thereof, of generally square acreage. More specifically, the system includes a string of pipe extending outwardly from a center pivot with an overhung boom on the end supported by the outermost tower and constructed to freely project a substantial distance beyond the outermost tower and to be withdrawn from its projected position so that it may be swung out to irrigate the corners and swung in along the sides.

8 Claims, 5 Drawing Figures

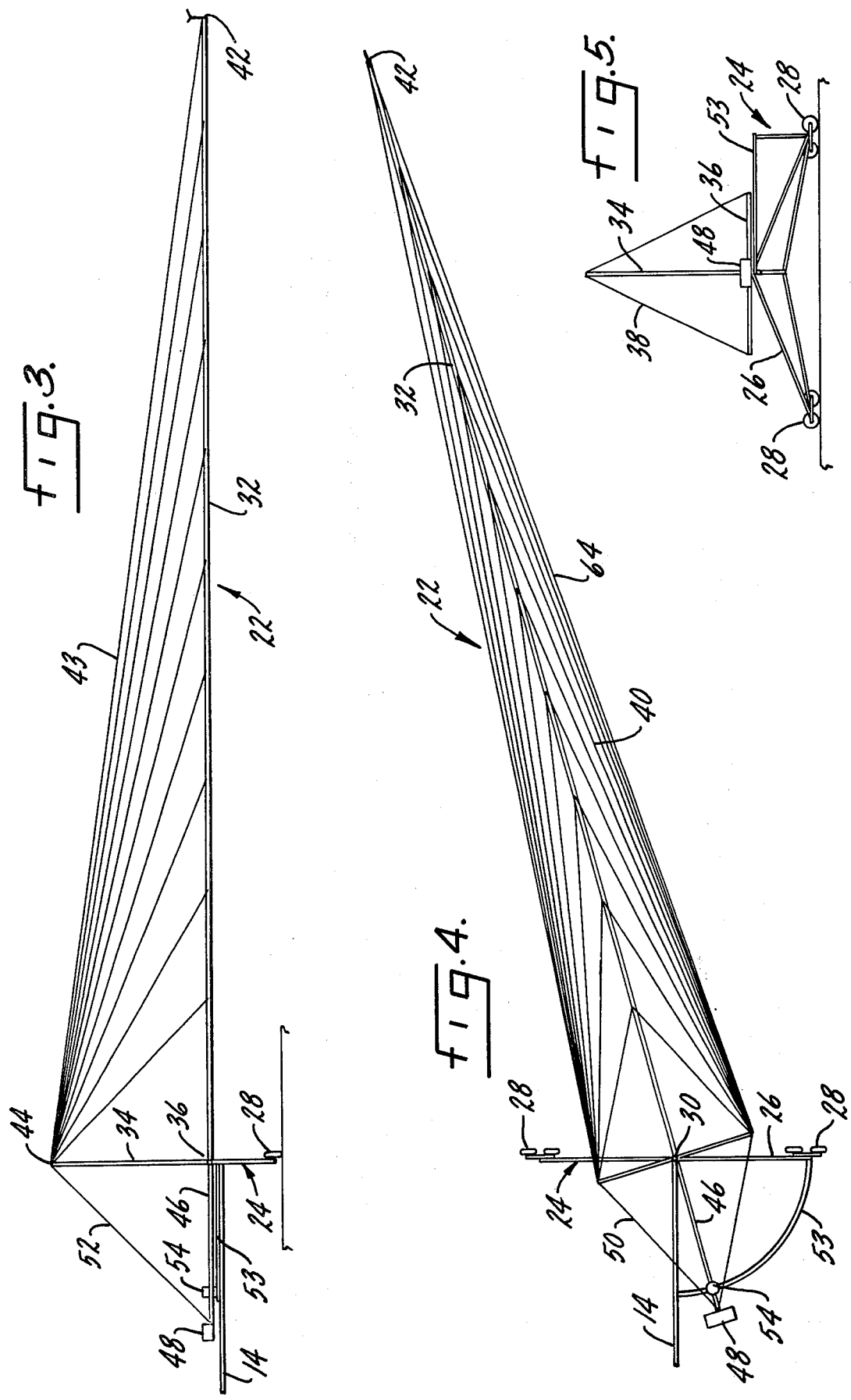

CORNER IRRIGATION MACHINE

SUMMARY OF THE INVENTION

This is concerned with a center pivot irrigation system and is more specifically directed to a mechanism for irrigating or watering the corners of a generally square field which the circular pattern of a conventional center pivot irrigation system cannot otherwise reach.

A primary object of the invention is a mechanism for irrigating the corners of a field which does not add greatly to the expense or complication of a center pivot unit.

Another object is a corner watering system which does not result in crop damage or knockdown in the corners.

Another object is a corner watering mechanism of the above type which uses greatly simplified controls.

Another object is a mechanism of the above type which is protected against wind damage.

Another object is a mechanism of the above type which substantially increases the acreage that may be irrigated.

Other objects will appear from time to time in the ensuing specification.

BRIEF DESCRIPTION OF THE DRAWINGS

FIG. 3 is a side view of the corner watering mechanism;

FIG. 4 is a top view of FIG. 3; and

FIG. 5 is an end view of FIG. 3.

DESCRIPTION OF THE PREFERRED EMBODIMENT

Figure 1:
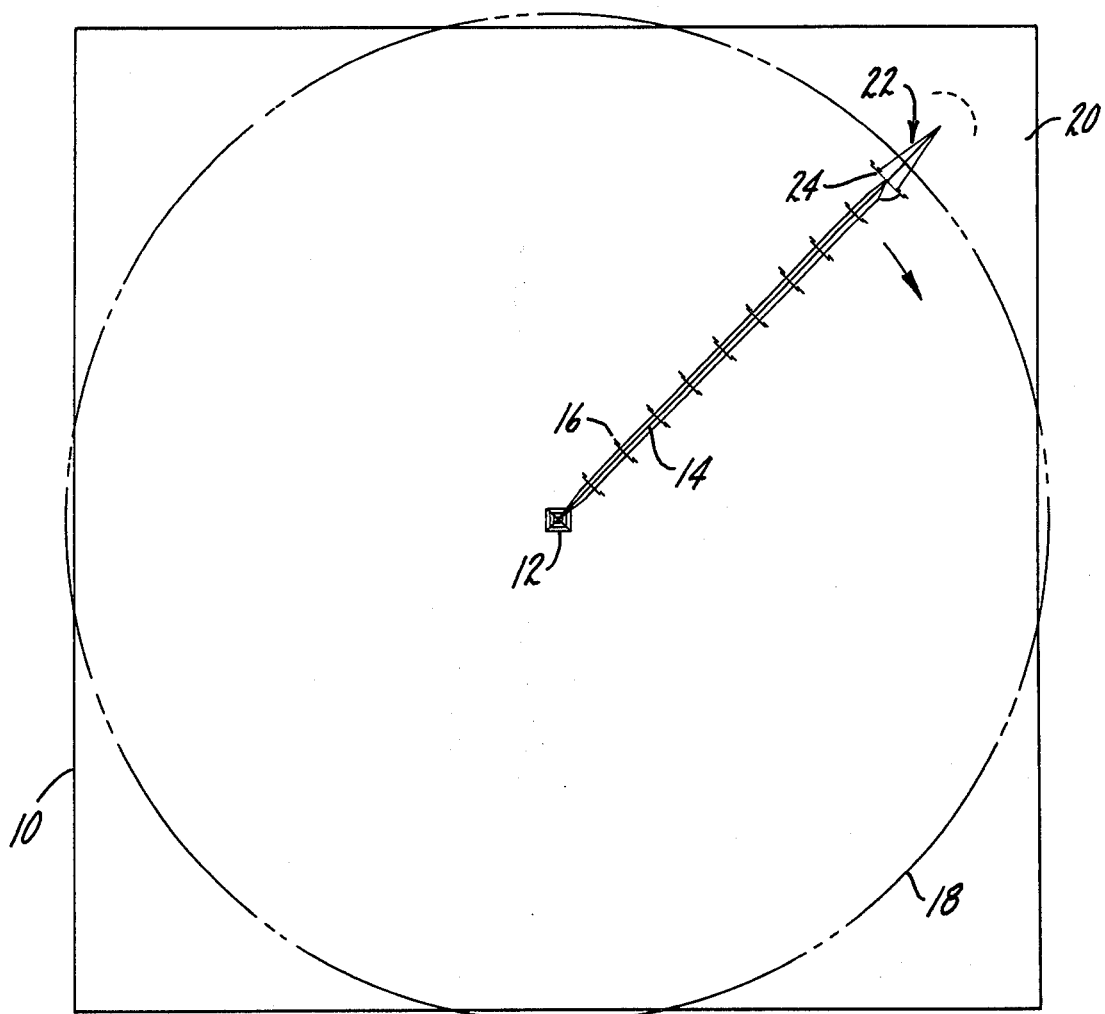
FIG. 1 is a diagrammatic illustration of a typical center pivot irrigation system with a corner watering mechanism diagrammatically indicated thereon.

FIG. 1 is a diagrammatic plan view of a typical center pivot irrigation system in which a generally square field, indicated generally at 10, of any suitable size has a center pivot at 12 disposed generally in the center thereof with a suitable pipeline, extending outwardly therefrom, as at 14, supported at intervals by movable towers 16, each of which may be self-propelled or otherwise so that a generally circular area 18 is irrigated by the system. A circular system of this nature cannot irrigate the corners 20 which amounts to a substantial loss in acreage, something on the order of 18 per cent of the total square.

To irrigate the corners, a boom mechanism 22 is mounted on and supported by the outermost tower 24, which is substantially larger than the towers inboard thereof, which may be conventional. As shown in FIGS. 3-5, the outermost tower may have an enlarged frame 26 with tandem wheels 28 on the forward and leading edges thereof, with the boom 22 being pivoted thereon about a generally vertical axis, as indicated at 30 in FIG. 4. The details of the pivot are not considered important here. The end of the pipeline 14 is shown as connecting into the end tower and any suitable coupling or hose arrangement may be used to connect the pipeline into the boom.

The boom itself may be made up of a long pipe or pipes 32 which may be either one continuous pipe or a series of pipes rigidly coupled or trussed or connected together with the pipe or pipes extending beyond the end of the center pivot system in a free overhang by a substantial amount, for example something on the order of 200 or more feet in a large unit. Inboard the boom carries an A-frame which may be made up of an upright 34 coincident with the pivot and a crosspiece or base 36 suitably interconnected along the ends thereof by guy wires or braces 38.

As shown in FIG. 4, the pipe or boom is braced horizontally by a plurality of cables or lines 40 connected at the ends of the crosspiece 36 and fanning out therefrom with connections at suitable intervals along the length of the pipe to the outer end 42 which may have an end gun.

In a vertical plane, as shown in FIG. 3, a similar set of cables 43 are all connected to the top of the mast 34, as at 44, and fanned outwardly and downwardly therefrom with their other ends connected at suitable intervals along the pipe to the outer end 42. The cables or guy wires will, horizontally and vertically, give a rigid, dimensionally stable boom or overhang which may be pivoted in a controlled manner on the enlarged end tower. The opposite side of the boom has an extension 46 with a suitable counterweight 48 along or at the end thereof with suitable bracing, such as horizontal guy wires 50 and a vertical guy wire 52. Pivoting of the boom about its center or axis 30 may be caused by a rack and pinion arrangement which may include a rack segment 53 suitably mounted on and extending from the rear of the frame and engaged by a pinion driven by a motor 54 on the rear frame extension. The teeth on the rack may be directed in, up, or out. But it is preferred that they open inwardly. A rack and pinion arrangement is merely an example of a drive mechanism that may be used, and it should be understood that any other suitable system will function as effectively, for example a direct power connection to the pivot 30, or a series of chains and pulleys to move the rear extension 46 in the nature of a boat boom.

The use, operation and function of the invention are as follows:

A corner irrigating boom in this case is supported on an enlarged tower and is constructed to extend beyond it a substantial distance so that substantial amounts of the corners may be irrigated. The overhanging boom has the advantage that none of the crops in the corners will be run over or knocked down by a complicated wheel arrangement. Also, the boom concept avoids the complicated control that inherently goes with a wheel-supported rig.

While the boom and its enlarged tower might, at first, appear large and awkward, it may be relatively light weight and need not involve or cause any flotation or traction problem.

Figure 2:
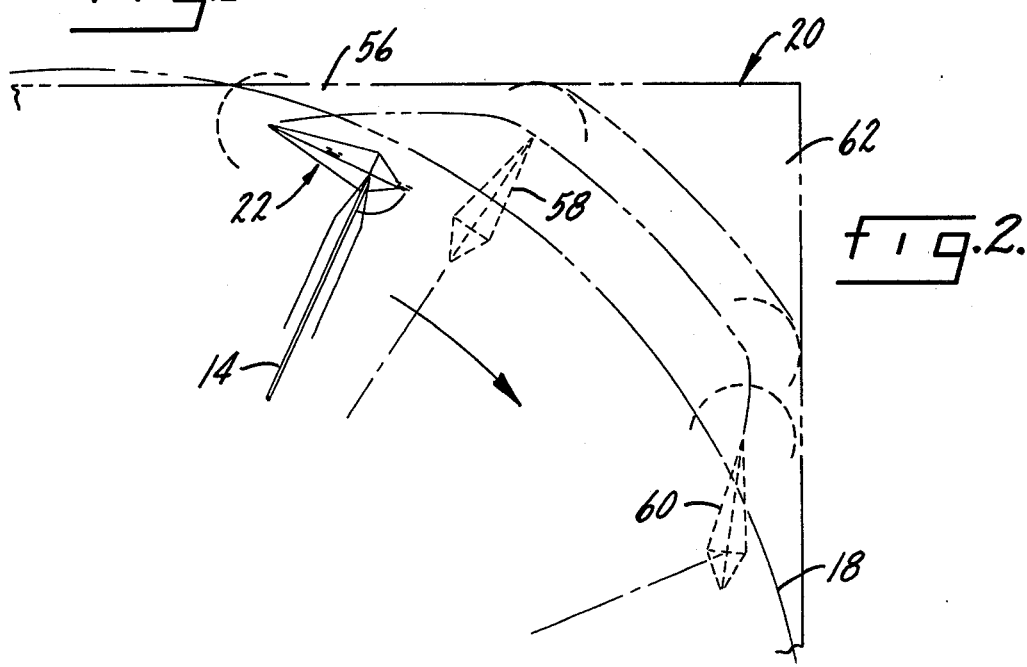
FIG. 2 is a diagrammatic illustration of a number of operative positions of the mechanism.

As diagrammatically indicated in FIGS. 1 and 2, the center pivot system 14 may be assumed to be pivoting clockwise. When the end of the rig is opposite a side, as indicated generally at 56, the boom may be folded back to a position more or less tangent to the circle 18. Thus the boom will not extend out over the edge of the field and possibly interfere with a fence, trees, or roads. As the system moves to a position opposite the corner, a control mechanism may energize the drive, be it the motor 54 or otherwise, to start clockwise movement of the boom 32 about its pivot 30 which will cause the boom to pivot out more or less to the position indicated at 58 until the boom reaches its fully extended position where it will hold as the center pivot system continues to move. Thus the boom may be in its fully extended position for some ten to 20° of system rotation through the 45° line from pivot to corner. At a suitable point a control will energize the drive motor 54 and cause counter-rotation of the boom, i.e. counterclockwise about its pivot 30, so that it begins to fold in, as shown at 60 in FIG. 2, until it is back to its fully retracted or tangent position where it will hold until it clears that side of the field and then will start its extending or pivoting movement again when it moves into the next corner. The end of the boom 42 may have an end gun, if desired, to irrigate a certain part of the corner beyond the end of the boom. But a certain part or percent of the corner, as indicated at 62, will not be irrigated which is too small to be concerned with. The exact size of the tip of the corner that may be left unirrigated is an economic balance between what can be recovered in crop and the expense and difficulty of extending the boom further.

A control for an arrangement of this type may be very simple and it may be done by a series of switches operating against a cam at the center pivot 12 to control motor 54. But preferably, posts or abutments might be fixed in the ground at the corners to engage a trip or wire on the boom or outermost tower to provide a positive or effective control for boom movement. This would have the advantage of avoiding misalignment of a cam at the center pivot 12 which, while it might be small, would be greatly magnified on the outer end of the rig.

Also, a trip wire sensing mechanism may be employed or extended along the leading edge of the boom, as at 64, so that in the event the boom malfunctions and extends at the wrong time, for example along one of the sides and possibly over a road or into a tree or power line tower, the trip wire or sensor will cause the entire center pivot unit and boom to shut down, thereby avoiding damage both to the rig and to passing motorists, power lines, or what-have-you.

In the event that wind is a problem, a wind-sensing mechanism may be mounted on the rig, for example on the top mast 44 which would detect wind velocity and at any give critical point, for example 40–50 miles an hour, could shut down the entire rig, both the boom and the center pivot unit. At the same time, the boom might also be mounted to pivot horizontally about an axis coincident with the cross brace 36 so that the outer end of the boom could be lowered to the ground upon shutdown, thereby avoiding the possibility of any wind damage. Also, the boom, when energized by the wind detector, might pivot all the way back, counterclockwise, in FIGS. 2 and 4, to a position where it is directed inwardly toward the center pivot and then automatically latched or coupled to the pipe truss or frame. This would require a suitable actuating mechanism, such as the rack 53, being extended through the second quadrant in FIG. 4.

In the diagrammatic arrangement in FIG. 1, the boom has been shown in a trailing position and, under certain circumstances, it may be desirable to extend it ahead of the center pivot unit so that it leads. But the trailing arrangement is preferred.

Under certain circumstances it may be desirable to have an auxiliary pump mounted on the boom to increase the water pressure along the length of the boom, the pump being carried by the frame or enlarged end tower.

While a preferred form of the invention has been shown and described and other modifications and changes have been suggested, it should be understood that suitable additional modifications, changes, substitutions and alterations may be made without departing from the invention's fundamental theme.

The embodiments of the invention in which an exclusive property or privilege is claimed are defined as follows:

1. In a center pivot irrigation system, a string of pipe extending outwardly from a center pivot and supported at intervals by movable towers, an overhung boom on and supported by the outermost tower and constructed to freely project a substantial distance beyond the outermost tower and to be withdrawn from its projected position, and power means for operating the boom so that it is freely overhung and extending substantially beyond the outermost tower in certain areas and is withdrawn to a position generally coincident with the outermost tower in other areas as the center pivot irrigation system moves around a field.

2. The structure of claim 1 further characterized in that the boom is pivoted on the outermost tower about a generally vertical axis and is counterweighted on the side opposite from the boom so that it is generally balanced about its pivot.

3. The structure of claim 1 further characterized in that the outermost tower is substantially enlarged relative to the other towers and the boom is pivoted thereon.

4. The structure of claim 1 further characterized by and including a sensing mechanism on the forward edge of the boom for deenergizing the entire system in the event of malfunction of the boom extension causing it to engage an obstacle, such as a tree, when it should be withdrawn.

5. The structure of claim 1 further characterized by and including a wind detector on the system constructed to deenergize the entire system when the wind velocity reaches a predetermined value.

6. The structure of claim 1 further characterized by and including a plurality of abutments positioned at intervals on the periphery of the system generally adjacent the path of the outermost tower, and sensing means at the outermost tower arranged to cooperate with the abutments to energize and deenergize the boom so that the abutments determine when the boom is extended substantially beyond the outermost tower and when it is withdrawn to a position generally coincident with the outermost tower.

7. The structure of claim 1 further characterized in that the boom is pivoted on the outermost tower and further characterized by and including a wind detector on the system with a control to the power means constructed and arranged to deenergize the system and to lower the boom to the ground when the wind velocity reaches a predetermined figure.

8. The structure of claim 1 further characterized in that the boom is pivoted on the outermost tower about a generally vertical axis with a counterweight on one side of the axis generally balancing the weight of the boom, the boom being generally oriented to trail the outermost tower during rotation of the system about the center pivot and to pivot to an extending position in the said certain areas and to counterpivot to its trailing position in the said other areas, the power means including a generally arcuate rack on the outermost tower engaging a pinion and motor drive on the boom.

* * * * *